United States Patent [19]
Carruth

[11] 3,777,653
[45] Dec. 11, 1973

[54] COOKING ACCESSORY

[76] Inventor: Jack I. Carruth, 1416 Yale St., Fort Worth, Tex. 76114

[22] Filed: Mar. 1, 1972

[21] Appl. No.: 230,889

[52] U.S. Cl.................... 99/339, 99/341, 99/349, 99/422
[51] Int. Cl. ............................................ A47j 37/10
[58] Field of Search................... 99/341, 349, 372, 99/376, 378, 419, 450; 294/12, 27, 49, 52, 55.5, 131; 30/322, 323

[56] References Cited
UNITED STATES PATENTS

| 663,483 | 12/1900 | Betts | 99/349 |
|---|---|---|---|
| 1,134,905 | 4/1915 | Prochaska | 294/27 R |
| 1,176,239 | 3/1916 | Page | 99/349 X |
| 1,881,615 | 10/1932 | Isaacson | 99/349 |
| 1,906,999 | 5/1933 | Parker | 99/349 |
| 2,241,040 | 5/1941 | Pringle | 99/341 |
| 2,705,657 | 4/1955 | DiGiorgio | 294/27 R |
| 3,313,230 | 4/1967 | Simjian | 99/372 X |

Primary Examiner—Billy J. Wilhite
Assistant Examiner—Arthur O. Henderson
Attorney—Wm. T. Wofford et al.

[57] ABSTRACT

A cooking accessory that is adapted to be employed in conjunction with another cooking utensil or to be employed as a cooking utensil and to be handled with a cooking fork characterized by a metallic centerpiece having both top and bottom surfaces adapted for cooking contact with the food without sticking; a raised outer edge extending peripherally about the metallic centerpiece for retaining juices about food cooked on the top thereof; and a handle having a base portion that will fit within the tines of a cooking fork and having an enlarged head to prevent the fork from slipping off the handle. The cooking accessory can be emplaced atop meat, such as bacon, frying in a skillet to eliminate problems with curling and wasteful shrinkage, and to obtain substantially uniform cooking. On the other hand, the cooking accessory can be employed on a grill and meat, eggs, hotcakes or the like cooked on its upper surface as on the surface of a griddle. In specific embodiments, the cooking accessory has foraminous, screen-like portions at one or more of its edges exteriorly of the raised edge to allow turning the cooking accessory to inspect the food to see if it has been cooked completely, draining grease or the cooking juices from around the food for more healthful food.

4 Claims, 4 Drawing Figures

PATENTED DEC 11 1973 3,777,653
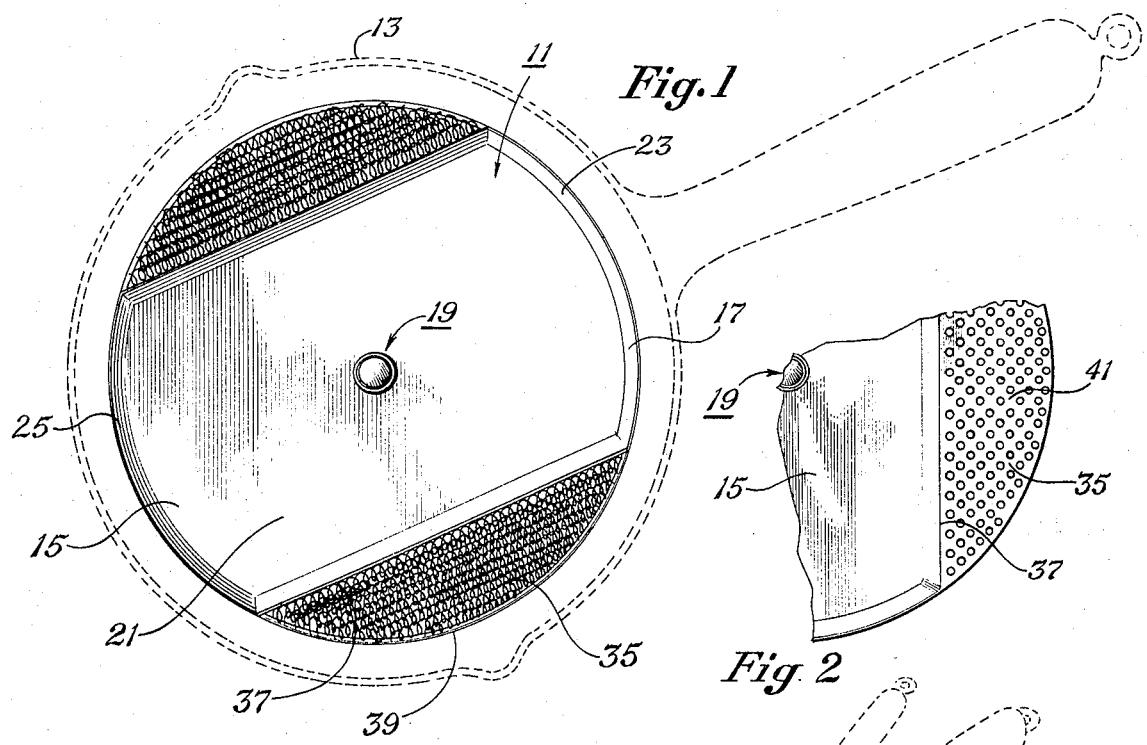
Fig. 1
Fig. 2
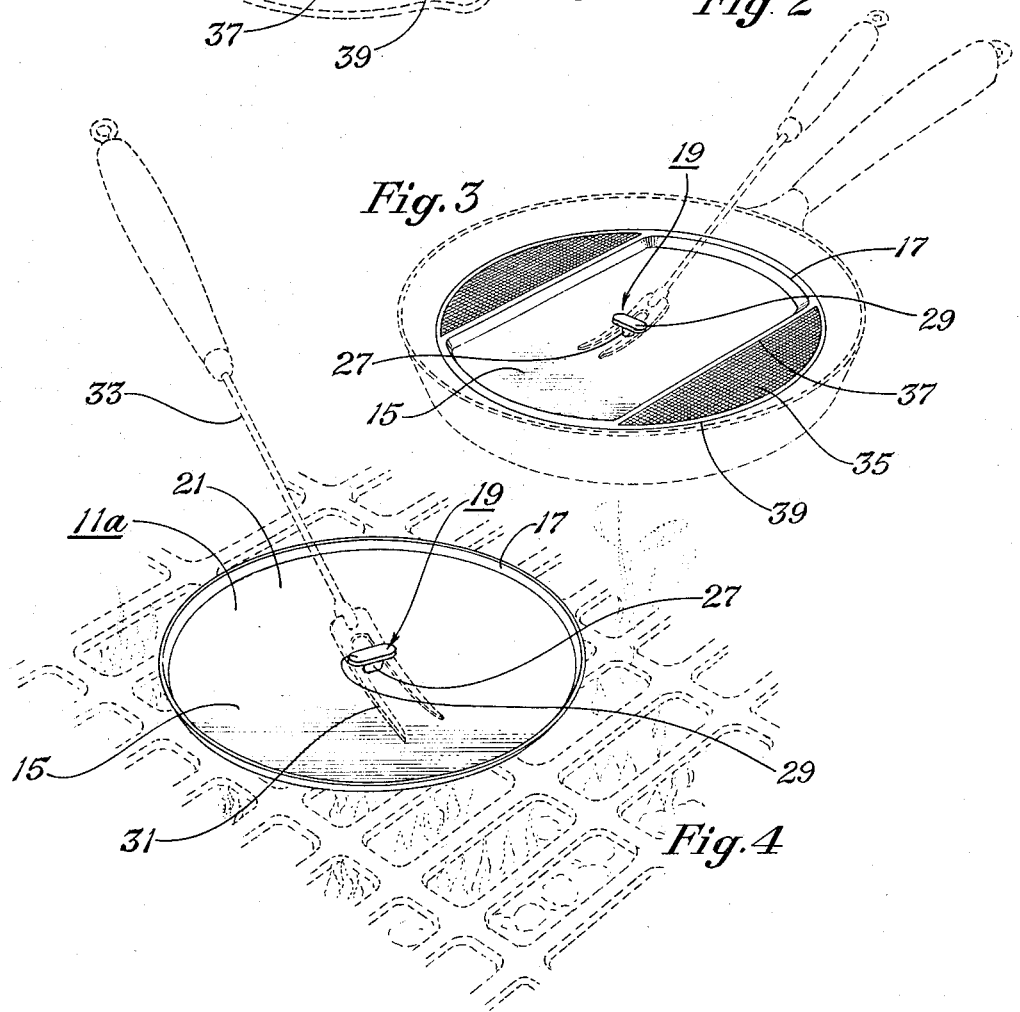
Fig. 3
Fig. 4

COOKING ACCESSORY

BACKGROUND OF THE INVENTION

1. Field of the Invention

This invention relates to a cooking accessory; and more particularly, to a cooking accessory that can be employed in conjunction with another cooking utensil, such as a skillet, or employed as a cooking utensil.

2. Description of the Prior Art

Many and different types of cooking utensils have been employed in the prior art. Aside from the usual utensils; such as, the skillet, the saucepan; the prior art cooking accessories have included simple accessories that helped in minor ways with obtaining more nearly perfect cooking. For example, flat pieces of hardwood, such as hickory, have been employed to hold steaks down on grills and to impart flavor thereto. Flat pieces of metal having a plurality of large diameter apertures spaced relatively uniformly thereacross have been employed to hold bacon down and the like. The relatively large apertures allowed less thoroughly cooked spots in the bacon and were less than desirable. On the other hand, nonsplatter screens have been employed for emplacement over the top of the skillet or the like to allow steam to pass therethrough while restraining the grease which would otherwise tend to pop onto the chef. Moreover, the screens did not hold a piece of bacon down to prevent it from an undesirable amount of shrinking and from curling such that portions of it would not cook as much as desired. Insofar as I am aware, there has not been a cooking accessory that would obviate the disadvantages of the prior art devices, delineated hereinbefore, as well as provide the following desirable features:

1. allow grilling meat; such as, bacon, steaks, hamburgers, ham, and the like; in skillets while maintaining the meat substantially flat by a bottom flat surface to prevent the meat from curling up, to make it cook more nearly uniformly and in a straight position to prevent undesirable shrinking, and to provide a more nearly perfectly cooked and more healthful final product;
2. serve as a cover for another utensil in which vegetable and the like is being cooked, or be used alone, as on a barbecue grill, to cook on its top, food; such as, eggs, bacon, sausage, fish and the like; while retaining the juices that cook from the food about the food for more healthful and more delicious food;
3. serve as a warmer which stores a substantial amount of sensible heat to keep the food warm longer after it is removed from the fire;
4. in specific embodiments serve as a strainer for draining cooking juices from around the food; and
5. be easily stored without a long protruding handle, yet allow handling with a conventional cooking fork, regardless of whether it is employed in conjunction with another cooking utensil or employed on a grill or the like as a cooking utensil.

SUMMARY OF THE INVENTION

It is a primary object of this invention to provide a cooking accessory that will obviate the disadvantages of the prior art and provide one or more of the desirable features delineated hereinbefore.

It is another object of this invention to provide a cooking accessory that will provide the above object and provide all of the desirable features delineated hereinbefore.

These and further objects will become apparent when read in conjunction with the following descriptive matter and the drawings.

BRIEF DESCRIPTION OF THE DRAWINGS

FIG. 1 is a plan view of one embodiment of this invention emplaced in a cooking utensil; such as, a skillet, shown in dashed lines.

FIG. 2 is a partial plan view of another embodiment of this invention.

FIG. 3 is an isometric view of still another embodiment of this invention.

FIG. 4 is an isometric view of still another embodiment of this invention, showing the cooking accessory emplaced on a grill and serving as a cooking utensil.

DESCRIPTION OF PREFERRED EMBODIMENTS

Referring now to FIG. 1, the cooking accessory 11 is illustrated emplaced in a skillet 13, dashed lines. The cooking accessory 11 comprises a metallic centerpiece 15, a raised outer edge 17, and a handle means 19 for handling the cooking accessory with a cooking fork or the like.

The metallic centerpiece 15 has both top and bottom surfaces, such as top surface 21, that core substantially flat and are manufactured such that they can be placed in contact with the food during cooking without creating problems sticking to the food. I have found it preferable to employ cast metallic centerpieces, since the surface of a cast metal has this property of alleviating difficulties with sticking to the food. For example, a particularly preferred embodiment comprises cast aluminum which may be employed contiguous the cooking food on either the top or bottom surfaces, without grease for more healthful food. If desired, non sticking high temperature polymer, such as the fluorocarbons, may be coated onto the metallic centerpiece on either one or both of its surfaces to provide stickfree cooking. If desired, any other form of metallic centerpiece 15 can be employed.

As illustrated in FIG. 1, the cooking accessory 11 has at least two opposed edges 23 and 25 that extend substantially entirely across the utensil, such as the skillet 13, such that the metallic centerpiece can be emplaced on the food to maintain it in a substantially flat position and prevent difficulties with curling and wasteful shrinking of the food. For example, since the top and bottom surfaces 21 are flat, the metallic centerpiece 11 can be placed on bacon in the skillet and cause the bacon to cook uniformly, without curling and without inordinate shrinking.

The raised outer edge 17 extends peripherally about the metallic centerpiece for retaining juices about food that is being cooked on the top surface 21. The raised outer edge 17 may extend any appropriate distance above the top surface 21 but, ordinarily, a raised edge of only about ¼ – ½ inch is adequate. Even smaller raised edges may be employed if the amount of cooking juices is not to be too great. On the other hand, higher raised edges may be employed if the amount of cooking juices will be great.

The handle means 19 comprises a knob having a base portion 27, FIGS. 3 and 4, and an enlarged head 29. The base portion may have any cross-sectional shape such that the tines 31 of a cooking fork 33 can be slipped about the base portion 27 beneath the enlarged head 29. If desired, the base portion may have a cross sectional shape, such as rectangular, and have sufficient outer dimensions to engage the tines of the fork such that torque can be imparted to manipulate the cooking accessory 11. TThe cooking accessory 11 can be lifted without the fork slipping from the handle 19, because of the enlarged head.

In FIGS. 1-3, the cooking accessory 11 is foreshortened at at least one edge and has a foraminous, screen-like structure 35 disposed exteriorly of the raised edge 17 adjacent the foreshortened edge, or edges. In FIG. 1 the foraminous, screen-like structure is a conventional splatter screen type of material suspended intermediate the outer edge 37 of the metallic centerpiece 15 and a peripherally extending member 39 that is carried by the metallic centerpiece 15. The peripheral member 39 may be integrally formed with the metallic centerpiece 15; it may comprise a steel wire that is affixed to the metallic centerpiece 15, as by thermal bonding, such as welding, brazing, or silver soldering; or any other support, if any, suitable to the nature of the foraminous, screen-like material 35. In the embodiment of FIG. 3, the foraminous, screen-like material 35 comprises a fine screen similarly suspended intermediate the outer edge 37 and the peripherally disposed member 39. If desired, of course, the screen may be self supporting. The foraminous, screen-like material 35 may comprise a perforate metallic structure 41, FIG. 2, that is affixed to the edge 37 by suitable means. Any one of the well known means may be employed. For example, a small bolt may engage a tapped aperture in the metallic centerpiece 15; the perforate metal member 41 may be slid into a slot in the metallic centerpiece, with or without an enlarged internal edge to hold it in place; or it may be adhered to the metallic centerpiece, as by a suitable high temperature adhesive, or thermal bonding.

In the embodiment of FIG. 4, on the other hand, the metallic centerpiece 15 is continuous without any foreshortening and without any additional foraminous, screen-like material on any of its edges. The embodiment of FIG. 4 is advantageous in that it may be employed either inside a skillet, as illustrated in FIG. 1, or on an open grill, fire or the like, as illustrated in FIG. 4. When employed on an open fire, eggs, pancakes, or a variety of meats may be cooked on the top surface 21, with or without a smoke cover thereover to obtain the desirable barbecue flavor. When emplaced in a skillet, the cooking accessory 11a will perform the same function delineated hereinbefore with respect to the cooking accessory 11, FIGS. 1-3. The embodiments of FIGS. 1-3 may be advantageous in certain instances, since they allow the chef to rotate the metallic centerpiece 15 and inspect the ends of the bacon or the like that is being cooked to ascertain the degree of doneness. Moreover, the foraminous, screen-like material 35 allows retaining the meat or the like in place and draining the cooking juices, such as the grease, from the cooking utensil. The foraminous, screen-like structure enables emplacing the cooking accessory on the top of utensils, such as soup pots, saucepans, and the like, to stop the splattering of the grease or boiling over of material, yet allows the steam to pass therethrough and be vented out the hood over the stove or the like.

The cooking accessory may have any shape commensurate with the utensil with which it will be employed. For example, it may have a relatively square shape for use with square electric skillets or a round shape for use with a conventional skillet. The size of the cooking accessory will be substantially the size of the inner diameter of the utensil with which it will be employed if it is to be employed interiorly thereof, as on top of the meat in the skillet. For example, for a 10 inch skillet, the cooking accessory may have a diameter of about 9-¾ inch. It may be about one-sixteenth inch in thickness. On the other hand, the metallic centerpiece may have a thickness of up to one-quarter inch or more.

In an economical embodiment, the handle means 19 is cast integrally with the metallic centerpiece 15; for example, by casting the enlarged head 29, the base portion 27, and the metallic centerpiece 15 of cast aluminum. On the other hand, a separate knob having the requisite shape of the handle means may be affixed centrally of the metallic centerpiece by any conventional means, as by a bolt or screw.

The cooking accessory may be easily stored, since it does not have an elongate handle, yet it can be manipulated with a conventional cooking fork. Aside from the uses of being employed in and as a cooking utensil; such as, in a skillet and on a grill, as delineated hereinbefore; it can serve as an excellent cookie sheet, since it can be inserted into the oven or removed from the oven by means of a cooking fork without running the risk or burning the hands or requiring potholders or the like.

The cooking accessory may be employed on top of steaks or the like to thaw them or cook them faster on grills with less fuel required, since heat is retained and transferred back into the meat; to protect the steaks from dust and foreign particles in the air; to cover bacon and prevent splattering when it is being fried, to prevent curling, shrinkage, and raw spots; to make toast on an open fire as over coals, by placing the bread on the top surface 21; to fry hotcakes and pancakes, or eggs; or to use as a cover over a large pot for food in that it allows circulation, yet keeps insects out. In summary, this invention provides the objects delineated hereinbefore and provides a cooking accessory that is extremely useful in a wide variety of applications.

Although this invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A cooking accessory that is adapted to be used in conjunction with a cooking utensil and to be used as a cooking utensil; and to be handled with a cooking fork, comprising:

a. a metallic centerpiece having both top and bottom surfaces that are flat from edge to edge and prepared such that they can be employed in contact with food during cooking without creating problems sticking to the food regardless of whether the bottom surface contacts the top of the food or whether the top surface contacts the bottom of the food that may be cooked on top thereof; said metallic centerpiece being of limited lateral extent for cooking and having width between at least two opposed edges sufficient to extend substantially entirely across said utensil adjacent its bottom such that said metallic centerpiece can be emplaced on said food in said cooking utensil to effect substantially uniform cooking and to alleviate problems with curling and wasteful shrinkage of the food;

b. a raised outer edge extending peripherally about said metallic centerpiece for retaining juices about said food during the cooking thereof on the top surface of said metallic centerpiece without said juices running off; and c. handle means for handling said cooking accessory with said cooking fork; said handle means comprising:

i. a base portion adapted to conformingly fit between the tines of said cooking fork and having a cross sectional shape with a diagonal dimension greater than its width such that said tines can be slipped into engagement therewith and can impart torque thereto without requiring separate handling; and ii. an enlarged head portion to prevent said fork from slipping off said handle means.

2. A cooking accessory that is adapted to be used in conjunction with a cooking utensil and to be used as a cooking utensil; and to be handled with a cooking fork, comprising:

a. a metallic centerpiece having both top and bottom surfaces that are prepared such that they can be employed in contact with food during cooking without creating problems sticking to the food; said metallic centerpiece being of limited lateral extent for cooking and having width between at least two opposed edges sufficient to extend substantially entirely across said utensil adjacent its bottom such that said metallic centerpiece can be emplaced on said food in said cooking utensil to effect substantially uniform cooking and to alleviate problems with curling and wasteful shrinkage of the food; said metallic centerpiece being foreshortened at at least one edge and having a foraminous, screen-like structure disposed exteriorly of said raised edge for being rotated such that a chef can view the degree of cooking which has been effected, and for pouring juices of cooking from a cooking utensil and for better and more healthful draining of the food;

b. a raised outer edge extending peripherally about said metallic centerpiece for retaining juices about said food during the cooking thereof on the top surface of said metallic centerpiece without said juices running off; and c. handle means for handling said cooking accessory with said cooking fork; said handle means comprising:

i. a base portion adapted to conformingly fit between the tines of said cooking fork and having a cross sectional shape such that said tines can be slipped into engagement therewith; and ii. an enlarged head portion to prevent said fork from slipping off said handle means.

3. The cooking accessory of claim 2 wherein said foraminous, screen-like structure is disposed along a plurality of said edges exteriorly of said raised edge.

4. The cooking accessory of claim 1 wherein a cooking fork is employed with said cooking accessory; wherein said cooking fork has a predetermined distance between its tines and said base portion of said handle means has a cross sectional dimension less than said predetermined distance and a diagonal cross sectional dimension greater than said predetermined distance and sufficient to engage said tines such that torque can be imparted to said cooking accessory with said fork alone.

* * * * *